(12) United States Patent  
Chen (10) Patent No.: US 9,736,187 B2  
(45) Date of Patent: Aug. 15, 2017

(54) DATA PROCESSING METHOD AND SYSTEM (71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 160 days.

(21) Appl. No.: 14/937,899

(22) Filed: Nov. 11, 2015

(65) Prior Publication Data

US 2017/0013017 A1 Jan. 12, 2017

(30) Foreign Application Priority Data

Jul. 6, 2015 (TW) .............................. 104121843 A (51) Int. Cl.  
*H04L 29/06* (2006.01)

(52) U.S. Cl.  
CPC .......... *H04L 63/20* (2013.01); *H04L 63/1425* (2013.01)

(58) Field of Classification Search  
CPC ..... H04L 63/00; H04L 63/02; H04L 63/0227; H04L 63/0245; H04L 63/0263; H04L 63/14; H04L 63/1425; H04L 63/20  
See application file for complete search history.

(56) References Cited

U.S. PATENT DOCUMENTS 9,197,658 B2 * 11/2015 Wittenschlaeger . H04L 63/1425  
2010/0100960 A1 4/2010 Wu et al.  
2012/0016816 A1 * 1/2012 Yanase ................. G06N 99/005  
706/10

(Continued)

FOREIGN PATENT DOCUMENTS

TW 201018140 5/2010  
TW 201220071 5/2012

OTHER PUBLICATIONS

Liao et al., "Towards Provenance-Based Anomaly Detection in MapReduce—2015 IEEE/ACM 15th International Symposium on Cluster, Cloud, and Grid Computing" [Online], May 4-7, 2015 [Retrieved on: Jun. 6, 2017], pp. 647-656, Retrieved from: <file:///C:/Users/eshepperd/Documents/e-red%20Folder/14937899/07152530.pdf >.*

(Continued)

*Primary Examiner* — Eric W Shepperd  
(74) *Attorney, Agent, or Firm* — Jianq Chyun IP Office (57) ABSTRACT

A data processing method and system, providing a data transmitting interface to a parallel computing system, are provided. The parallel computing system includes a mapper, a reducer, and an operation device. The data transmitting interface intercepts a parallel computing input command transmitted from the mapper and an output result transmitted from the operation device. The data transmitting interface transmits the parallel computing input command to the operation device after receiving the parallel computing input command and when the parallel computing input command is not abnormal based on a security policy is determined. The data transmitting interface transmits the output result to the reducer after receiving the output result and when the output result is not abnormal based on the security policy is determined.

20 Claims, 3 Drawing Sheets

(56) References Cited

U.S. PATENT DOCUMENTS

| | | | |
|---|---|---|---|
| 2013/0173560 A1* | 7/2013 | McNeill | G06F 17/30303 707/692 |
| 2013/0174256 A1* | 7/2013 | Powers | H04L 63/1416 726/23 |
| 2013/0318119 A1* | 11/2013 | Dalal | G06F 13/16 707/769 |
| 2013/0326579 A1 | 12/2013 | Bhatti et al. | |
| 2014/0059552 A1* | 2/2014 | Cunningham | G09G 5/00 718/102 |
| 2014/0064066 A1* | 3/2014 | Lumezanu | H04L 47/12 370/229 |
| 2014/0196115 A1* | 7/2014 | Pelykh | H04L 63/08 726/4 |
| 2015/0127649 A1* | 5/2015 | Felch | G06F 17/30477 707/737 |
| 2015/0128274 A1* | 5/2015 | Giokas | H04L 63/1425 726/23 |
| 2015/0149503 A1* | 5/2015 | Wollrath | G06F 17/30194 707/770 |
| 2016/0205140 A1* | 7/2016 | Verma | G06F 17/30463 726/1 |
| 2016/0269427 A1* | 9/2016 | Haugsnes | H04L 67/1097 |

OTHER PUBLICATIONS

Wei et al., "SecureMR: A Service Integrity Assurance Framework for MapReduce—2009 Annual Computer Security Applications Conference" [Online], Dec. 7-11, 2009 [Retrieved on Jun. 6, 2017], pp. 73-82, Retrieved from: <file:///C:/Users/eshepperd/Documents/e-red%20Folder/14937899/05380520.pdf >.*

"Office Action of Taiwan Counterpart Application" with partial English translation, issued on Apr. 15, 2016, p. 1-p. 25.

* cited by examiner

DATA PROCESSING METHOD AND SYSTEM

CROSS-REFERENCE TO RELATED APPLICATION

This application claims the priority benefit of Taiwan application serial no. 104121843, filed on Jul. 6, 2015. The entirety of the above-mentioned patent application is hereby incorporated by reference herein and made a part of this specification.

BACKGROUND

Field of the Disclosure

The disclosure is related to a data processing mechanism, and particularly related to a data processing method and system used for parallel computing.

Description of Related Art

With rapid development of Internet technology, Internet has become an alternative medium for transmitting and exchanging information. While Internet expedites information exchange worldwide, more and more people develop the habit of carrying out communication in the virtual world apart from the real world. In the meantime, there is an increasing number of people who make malicious attack through the Internet. To prevent malicious attack, a firewall technology has been developed. Firewall is a mechanism that helps to ensure information security by permitting or restricting data transmission based on specific rules.

In the current era of big data, the local computing is no longer used, and instead, the computing uses the remote host machine resources via the calling function. The traditional method to handle security is that the internet firewall is used to filter and to restrict, but passing through the internet firewall does not represent obtaining calculation capability. Otherwise, the firewall itself is often manufactured by the application-specific integrated circuit (ASIC), so that the cost is high and it is difficult to upgrade. In addition, the existing data firewall is not applicable in the current era of big data. Because hackers steal not only the huge amount of data but also the results after analyzing the huge amount of data and the forecast information. For example, based on the information predicted from the health examination record, the hacker can buy insurance from an insurance company and obtain a huge insurance claim, so as to create social problems. The hacker does not even need to write an analysis program because the analysis program often exists in the location of resource, so that the hacker can exploit the unrestricted holes to call the analysis program, so as to obtain the desired forecast information. Accordingly, it is an important issue in the field to design a good firewall.

SUMMARY

The disclosure provides a data processing method and system which can handle the attacks of the illegal user and the lawful user.

In the data processing method in the disclosure, a data transmitting interface is provided to a parallel computing system. The parallel computing system includes a mapper, a reducer, and at least an operation device. The mapper receives a command and transmits a parallel computing input command corresponding to the command to the operation device, the operation device executes a calculation based on the parallel computing input command to generate an output result and transmits the output result to the reducer. The data transmitting interface is located between the mapper and the operation device, and the data transmitting interface is located between the operation device and the reducer. The following steps are executed via the data transmitting interface, including: intercepting the parallel computing input command transmitted from the mapper; determining whether the parallel computing input command is abnormal based on at least a security policy after receiving the parallel computing input command; transmitting the parallel computing input command to the operation device when the parallel computing input command is determined to be not abnormal; intercepting the output result transmitted from the operation device; determining whether the output result is abnormal based on at least a security policy after receiving the output result; and transmitting the output result to the reducer when the output result is determined to be not abnormal.

In one embodiment of the disclosure, after the parallel computing input command is received via the data transmitting interface, further comprise: calling a receiver function; determining whether one or more parameters inside the receiver function are abnormal based on the security policy; calling a transfer function when the parameters inside the receiver function are determined to be not abnormal; determining whether one or more parameters inside the transfer function are abnormal based on the security policy; and transmitting the parallel computing input command to the operation device when the parameters inside the transfer function are determined to be not abnormal.

In one embodiment of the disclosure, after the output result is received via the data transmitting interface further comprise: calling a receiver function; determining whether one or more parameters inside the receiver function are abnormal based on the security policy; calling a transfer function when the parameters inside the receiver function are determined to be not abnormal; determining whether one or more parameters inside the transfer function are abnormal based on the security policy; and transmitting the output result to the reducer when the parameters inside the transfer function are determined to be not abnormal.

In one embodiment of the disclosure, the security policy records a security rule and a corresponding processing action. The data processing method further comprises: the parallel computing input command and the output result transmitted are determined whether to match the security rule via the data transmitting interface. If the received parallel computing input command or the received output result matches the security rule, the data transmitting interface obtains the processing action corresponding to the matched security rule.

In one embodiment of the disclosure, after the data transmitting interface obtains the processing action corresponding to the matched security rule, transmitting the parallel computing input command to the operation device via the data transmitting interface, or transmitting the output result to the reducer via the data transmitting interface if the processing action is an active action; transmitting the parallel computing input command to the operation device, or transmitting the output result to the reducer after a content of the parallel computing input command or a content of the output result is adjusted via the data transmitting interface if the processing action is a filter action; if the processing action is a block action, isolating the parallel computing input command or the output result via the data transmitting interface so that the data transmitting interface blocks the parallel computing input command or the output result.

In one embodiment of the disclosure, if the received parallel computing input command or the received output result matches the security rule and determined to be normal, the data transmitting interface transmits the parallel computing input command to the operation device or transmits the output result to the reducer. If the received parallel computing input command or the received output result does not match the security rule so as to be determined as abnormal, the data transmitting interface obtains the processing action corresponding to the security rule. If the processing action is the filter action, the parallel computing input command or the output result is adjusted. If the processing action is a block action, the parallel computing input command or the output result is blocked.

In one embodiment of the disclosure, the data transmitting interface transmits an abnormality notification to the mapper so that the mapper adjusts the parallel computing input command and retransmits the parallel computing input command after the data transmitting interface blocks the parallel computing input command or the output result.

In one embodiment of the disclosure, the data processing method further includes: generating the security policy via the controller, and transmitting at least a security policy to the data transmitting interface via the controller. Generating the security policy via the controller includes: analyzing a plurality of command logs, so as to obtain at least a predictive rule used for the operation device; executing an anomaly detection for the command logs via the controller based on the at least a predictive rule, so as to obtain at least a command cluster; and establishing at least a security policy corresponding to at least a predictive rule via the controller based on the command log in each of the command clusters.

In one embodiment of the disclosure, the steps of analyzing the command log via the controller to obtain at least a predictive rule used for the operation device includes: executing anomaly detection to the command logs to obtain a plurality of similar clusters; obtaining a predictive threshold range from each of the similar clusters; and comparing the predictive threshold ranges to obtain at least a predictive rule.

In one embodiment of the disclosure, the data processing method further includes: accumulating a number of receiving times into a corresponding receiving record via the data transmitting interface, and transmitting the receiving record to the controller, so that the controller updates the at least a security policy.

The data processing system of the disclosure includes a parallel computing system and a data transmitting interface. The parallel computing system includes a mapper, a reducer, and an operation device. The mapper receives a command and transmits a parallel computing input command corresponding to the command to the operation device, the operation device executes a calculation based on the parallel computing input command to generate an output result and transmits the output result to the reducer. A data transmitting interface is located between the mapper and the operation device, and located between the operation device and the reducer, wherein the data transmitting interface intercepts the parallel computing input command transmitted from the mapper and intercepts the output result transmitted from the operation device; the parallel computing input command is determined whether to be abnormal based on the security policy after the data transmitting interface receives the parallel computing input command, and when the parallel computing input command is determined to be not abnormal, the parallel computing input command is transmitted to the operation device. The output result is determined whether to be abnormal based on the security policy after the data transmitting interface receives the output result, and when the output result is determined to be not abnormal, the output result is transmitted to the reducer.

Based on the above, the data transmitting interface is used to achieve the concept of two-way firewall (from the mapper to the data transmitting interface, and from the operation device to the data transmitting interface), and the data transmitting interface can execute security verification for the parallel computing input command and the output result, so as to achieve the bidirectional protection.

In order to make the aforementioned and other features and advantages of the disclosure more comprehensible, embodiments accompanying figures are described in detail belows.

DESCRIPTION OF THE EMBODIMENTS

Figure 1:
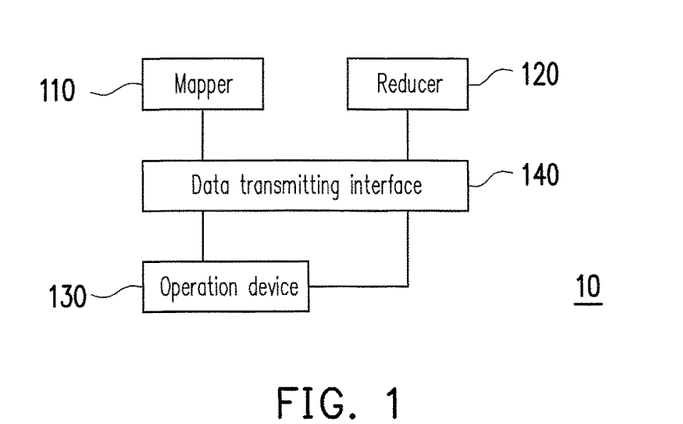
FIG. 1 is a block view illustrating a data processing system according to an embodiment of the disclosure.

FIG. 1 is a block view illustrating a data processing system according to an embodiment of the disclosure. Referring to FIG. 1, a data processing system 10 includes a mapper 110, a reducer 120, an operation device 130, and a data transmitting interface 140. The mapper 110, the reducer 120, and the operation device 130 are included inside the parallel computing system. Namely, the data processing system 10 as shown in FIG. 1 provides the data transmitting interface 140 to the parallel computing system, a parallel computing input command or an output result is determined whether to be abnormal based on a security policy via the data transmitting interface 140.

In the present embodiment, the parallel computing system adopts the MapReduce architecture, the large-scale operating data set is distributed to every node on the network (the node is, for example, an electronic device having a computing capability) so as to achieve reliability, and each node periodically updates and reports the completed works and the status back. The MapReduce architecture can be divided into two stages: Map and Reduce. The huge amount of data is divided into a plurality of smaller and independent data segments, each data segment is sent to one operation device 130 and calculated, and the output after calculating is the input of the reducer 120.

The mapper 110 and the reducer 120 are, for example, any electronic devices having a computing capability on internet. In FIG. 1, one operation device 130 and one data transmitting interface 140 are depicted only for the convenience of explanation. However, the number of the operation device 130 and the data transmitting interface 140 can be one or many, but the disclosure is not limited thereto.

In addition, the parallel computing system adopts, for example, the communication protocols of the message passing interface (MPI). MPI is a cross-language communication protocol, such as application programming interface (API)

for parallel computing. An outside transmitter can transmit a command via the mapper 110, and the mapper 10 is used to convert the format of the command to meet the regulation of MPI, so as to obtain the parallel computing input command corresponding to the command. In other embodiments, the parallel computing system also can be applied to the architecture of the distributed shared memory (DSM), or can be applied to the architecture of the parallel virtual machine.

Herein, the data transmitting interface 140 is provided to monitor the parallel computing input command and the output result of the parallel computing system so that the data transmitting interface 140 is used to achieve the concept of two-way firewall. In addition, the data transmitting interface 140 intercepts and judges the parallel computing input command and the output result without being noticed by the mapper 110 and the reducer 120.

The data transmitting interface 140 is achieved by a hardware, disposed in any electronic devices, or disposed in the operation device 130. The data transmitting interface 140 is, for example, a storage adapter, or a proxy. The function of the firewall is achieved by recording the security policy in the data transmitting interface 140, related details are described below. Otherwise, the data transmitting interface 140 can also be achieved by a software, and a processor having a computing function is used to drive and to execute the data transmitting interface 140. The operation device 130 can be constructed by one or a plurality of hardware storage units, and the operation device 130 can further include a plurality of storage spaces.

The data transmitting interface 140 is located between the mapper 110 and the operation device 130 and located between the operation device 130 and the reducer 120. The data transmitting interface 140 intercepts the parallel computing input command transmitted from the mapper 110 and the output result transmitted from the operation device 130. After the data transmitting interface 140 receives the parallel computing input command, the parallel computing input command is determined whether to be abnormal based on the security policy. When the parallel computing input command is not abnormal, the data transmitting interface 140 transmits the parallel computing input command to the operation device 130.

After that, the data transmitting interface 140 continuously monitors whether the operation device 130 transmits the output result. After the data transmitting interface 140 receives the output result, the output result is determined whether to be abnormal based on the security policy. When the output result is not abnormal, the data transmitting interface 140 transmits the output result to the reducer 120. Accordingly, the security verification is executed for the parallel computing input command and the output result, so as to achieve bidirectional protection.

Otherwise, the transmitter which gives the command to the mapper 110 and the receiver which receives the output result via the reducer 120 can be the same and also can be different.

Figure 2:
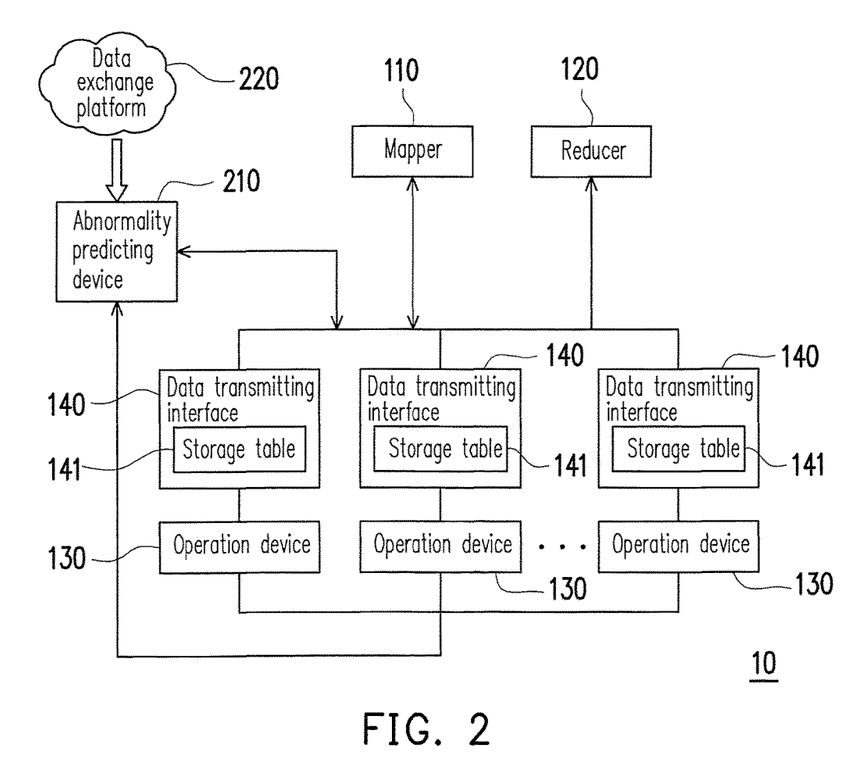
FIG. 2 is a block view illustrating another data processing system according to an embodiment of the disclosure.

FIG. 2 is a block view illustrating another data processing system according to an embodiment of the disclosure. In the present embodiment, the data processing system 10 includes a plurality of the data transmitting interfaces 140 and a plurality of the operation devices 130, one data transmitting interface 140 is configured corresponding to one or a plurality of the operation devices 130 (only one is depicted in FIG. 2, but the disclosure is not limited thereto), and the data transmitting interface 140 serves as a firewall of the operation device 130. In addition, the data processing system 10 further includes an abnormality predicting device 210.

The abnormality predicting device 210 is, for example, an electronic device such as a personal computer, a notebook computer a tablet PC, a smart phone, a server, etc., that have computing capability. The abnormality predicting device 210 generates the security policy according to a plurality of command logs. The command logs include a command log returned by the data transmitting interface 140 or the operation device 130, and can include a command log provided by an external data exchange platform 220. The command log of the data exchange platform 220 may be shared by the manufacturer or other users.

Figure 3:
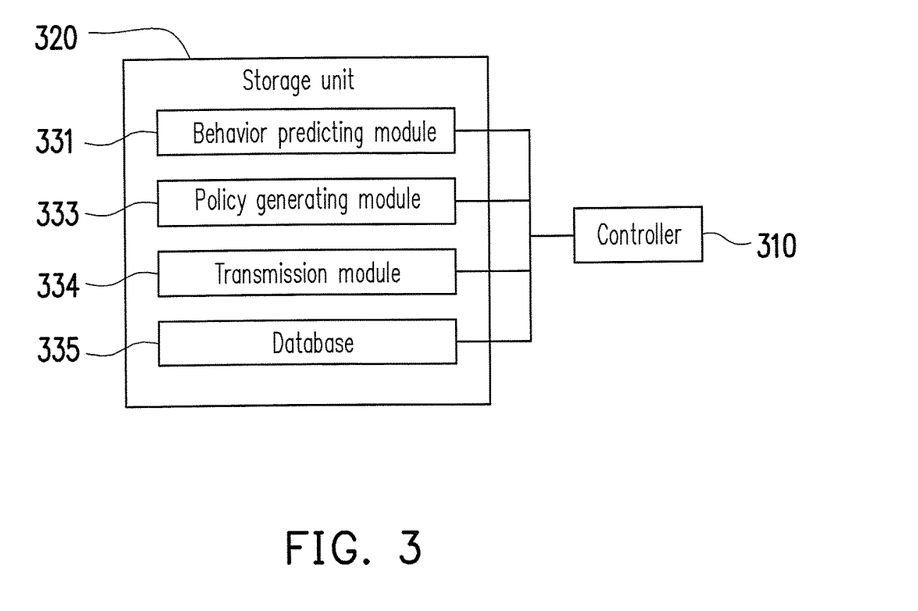
FIG. 3 is a block view illustrating an abnormality predicting device according to an embodiment of the disclosure.

FIG. 3 is a block view illustrating an abnormality predicting device according to an embodiment of the disclosure. The abnormality predicting device 210 includes a controller 310 and a storage unit 320. The controller 310 is, for example, a central processing unit (CPU), a microprocessor, an embedded controlling chip, a digital signal processor (DSP), an application specific integrated circuit (ASIC), or other similar devices. The storage unit 320 is, for example, a non-volatile memory, a random access memory (RAM) or a hard disk.

The controller 310 is coupled to the storage unit 320. In the embodiment, the abnormality predicting method is achieved via a program code. Namely, the storage unit 320 stores a plurality of program code segments. The program code segment is executed by the controller 310 after being installed so as to achieve the abnormality predicting method. Here, the storage unit 320 includes a plurality of modules, and each module is constructed by one or a plurality of program code segments. The modules include a behavior predicting module 331, a policy generating module 333 and a transmission module 334. In addition, the storage unit 320 further includes a database 335. The database 335 stores a plurality of command logs. In other embodiments, the behavior predicting module 331, the policy generating module 333, and the transmission module 334 can also be achieved via a processor hardware or one or a plurality of logic gate chips.

The behavior predicting module 331 analyzes the command logs in the database 335, so as to obtain a predictive rule used for the operation device 130. The behavior predicting module 331 executes an anomaly detection for the command logs recorded by the database 335, so as to obtain similar clusters. After that, a predictive threshold range is obtained from each of the similar clusters and the predictive threshold ranges are compared to obtain the predictive rule.

The controller 310 classifies command logs that record similar behaviors into the same cluster (similar cluster) via an anomaly detection. Here, the anomaly detection algorithm is executed by applying the deviation based outlier detection algorithm to the association rule algorithm and the frequent itemset algorithm. The deviation based outlier detection algorithm is, for example, a sequence anomaly algorithm which is executed in the manner that, after a series of similar data is obtained, an element that disturbs the series is considered as an exception. A set S having $n^{th}$ elements is provided to establish a subset sequence $Sj=\{1, S2, \ldots, Sm\}$, wherein $2<m<n$ and $Sj-1 \subset Sj$, $S \subseteq S$. Next, comparisons are made between every subset to compare the difference between the subset and the preceding subset. In the meantime, a smoothing factor is employed to determine which set is abnormal. The smoothing factor is defined as the amount that the different degree is reduced when one subset is removed from the raw data.

In addition, it may be determined which similar clusters may be normal and which similar clusters may be abnormal according to the number of command logs included in each similar cluster. For example, the similar cluster that includes the most command logs represents that the most actions are the same. Generally speaking, there are few abnormal commands in the collected command logs. Therefore, the similar cluster that has the least command logs may be an abnormal cluster. Therefore, the controller 310 may obtain a corresponding predictive rule based on the plurality of similar clusters. For example, the predictive threshold range is obtained from each of the similar clusters and the predictive threshold ranges are compared so as to obtain at least a predictive rule.

Here, the predictive rule is, for example, congestion threshold, repeat request threshold, illegal access threshold and so on. The congestion threshold refers to a sum of commands that can be accepted in a period of time. The repeat request threshold refers to a sum of times of resending data package (command) that can be accepted in a period of time when the data package is lost. The illegal access threshold refers to the sum of illegal access commands that can be executed by a specific user in a period of time.

The numeral range of the predictive rule such as the congestion threshold, repeat request threshold and illegal access threshold can be obtained, for example, through the following means. The threshold ranges represented by each similar cluster are calculated and compared to obtain a set having a representative numeral range. For example, the numeral range that is the least similar to numeral ranges of other clusters is set as the predictive rule. Assuming that similar clusters A, B, C and D are obtained, and the predictive threshold ranges are ranges a, b, c and d. If range d is the least similar to ranges a, b and c, it can be determined that similar cluster D is an abnormal cluster, and the predictive rule can be obtained based on the range d. In another way, the similar clusters A, B and C can be determined as normal clusters, and the predictive rule can be obtained based on ranges a, b and c.

The policy generating module 333 is, for example, K-means algorithm or K-nearest neighbors (KNN) algorithm, etc., and the anomaly detection is executed to the command logs, so as to obtain the command cluster that meets the predictive rule based on the above predictive rule. In addition, the policy generating module 333 establishes a security policy corresponding to the predictive rule based on the one or more command logs in each command cluster. For example, one predictive rule corresponds to one security policy. The security policy is at least a of, for example, access authority, access frequency, amount of computation or a combination thereof, which should not be construed as a limitation to the disclosure.

The transmission module 334 transmits the security policy to the data transmitting interface 140, so that the data transmitting interface 140 obtains a processing action for the received parallel computing input command or the received output result according to the security policy. The processing action is, for example, an active action, a filter action or a block action. The active action is directly transmitting the parallel computing input command or the output result to the specified destination. The filter action is adjusting the parallel computing input command or the output result. The block action is blocking the parallel computing input command or the output result.

Figure 4:
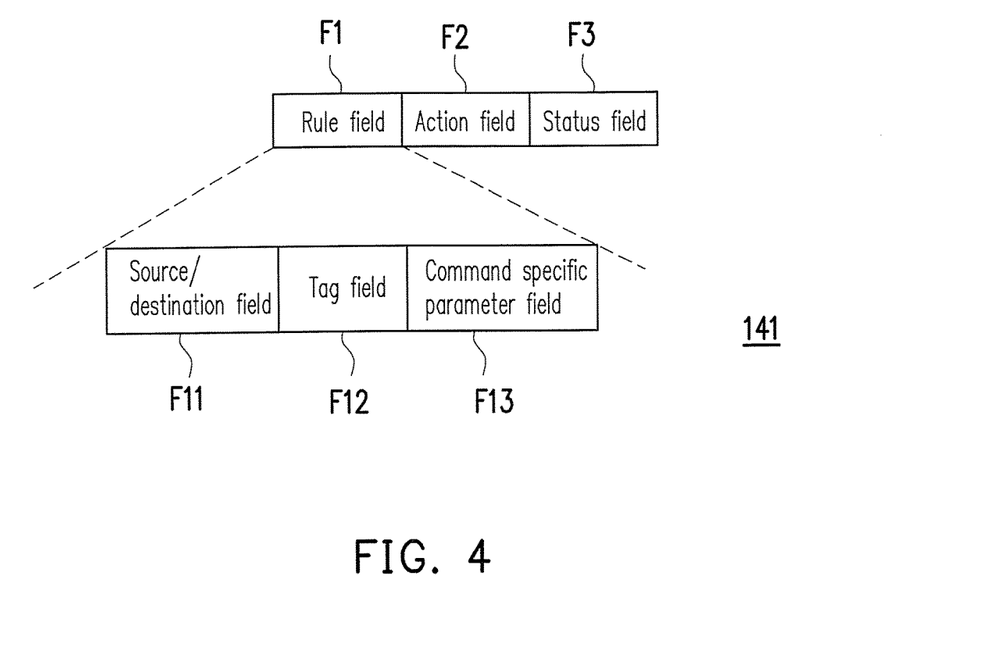
FIG. 4 is a schematic view illustrating a storage table according to an embodiment of the disclosure.

In addition, after the data transmitting interface 140 receives the security policy, the data transmitting interface 140 further converts the security policy into a format that complies with the storage table 141 so as to write the security policy into the storage table 141. FIG. 4 is a schematic view illustrating a storage table according to an embodiment of the disclosure. The security policy records a security rule and a corresponding processing action. After receiving the security policy, the data transmitting interface 140 converts the security policy into a format that complies with the storage table 141 so as to write the security rule and the processing action into corresponding fields.

Referring to FIG. 4, the storage table 141 includes three fields, namely, a rule field F1, an action field F2, and a status field F3. After obtaining the security policy, the data transmitting interface 140 writes the security rule into the rule field F1, and writes the processing action into the action field F2. The processing action is, for example, an active action, a filter action or a block action. The rule field F1 includes a source/destination field F11, a tag field F12, and a command specific parameter field F13. The source/destination field F11 records the source address and destination address. The tag field F12 records the executing action. For example, the parallel computing input command which complies the MPI standard, the summation function, the product function, etc., are recorded in the tag field F12. The command specific parameter field F13 records the content of the parameters of the tag. The action field F2 records the processing action. The status field F3 records the number of receiving the parallel computing input command.

In the embodiment, when the processing action corresponding to the matched security rule is the filter action or the block action, the parallel computing input command or the output result is determined as abnormal. When the processing action corresponding to the matched security rule is the active action, the parallel computing input command or the output result is determined as normal.

Under the condition that the processing action is the active action, the data transmitting interface 140 transmits the parallel computing input command to the operation device 130 directly, or transmits the output result to the reducer 120 directly. Under the condition that the processing action is the filter action, the data transmitting interface 140 transmits the parallel computing input command to the operation device 130, or transmits the output result to the reducer 120 after the content of the parallel computing input command or the content of the output result is adjusted via the data transmitting interface 140. Under the condition that the processing action is the block action, the data transmitting interface 140 isolates the parallel computing input command or the output result so that the data transmitting interface 140 blocks the parallel computing input command or the output result.

In addition, in other embodiments, the security rule of the security policy can also be employed for simply defining whether the parallel computing input command or the output result is a lawful security rule, and the corresponding processing action of the action field F2 records the abnormality preventing action under the condition that the parallel computing input command or the output result is determined as illegal (abnormal). For example, when the parallel computing input command and the output result matches the security rule, after being determined as not abnormal, the parallel computing input command and the output result are directly transmitted to the specified destination. Under the condition that the parallel computing input command or the output result does not match the security rule so as to be determined as abnormal, the parallel computing input command or the output result is adjusted when the corresponding abnormality preventing action is the filter action, and the parallel computing input command or the output result is blocked when the corresponding abnormality preventing action is the block action.

Here, each operation device 130 can include a plurality of storage spaces. The size of the storage space may be determined depending on the data transmission bandwidth. The number of times that the parallel computing input command are received can be accumulated to calculate whether the data transmission bandwidth reaches the minimum transmission rate.

When the parallel computing input command enters the data transmitting interface 140, the data transmitting interface 140 queries the security policy which is recorded, so as to determine whether the parallel computing input command is abnormal. The number of receiving times is accumulated, regardless of whether the parallel computing input command is normal or not. Accordingly, the amount of the parallel computing input command received in a period of time can be further calculated, and the security policy can be further updated based on the number of receiving times.

For example, in the case where the maximum congestion threshold initially set by the security policy is 5 times/10 sec. Assuming that 10 parallel computing input commands are received from a source address aa within ten seconds, the top 5 parallel computing input commands are executed and the 6th parallel computing input command and subsequent parallel computing input commands are not executed. After the receiving record is returned to the controller 310, the controller 310 updates the security policy, for example, by directly blocking the source address aa and rejecting the parallel computing input command transmitted from the source address aa. However, the above descriptions are provided as an example only, which should not be construed as a limitation to the disclosure.

Figure 5A:
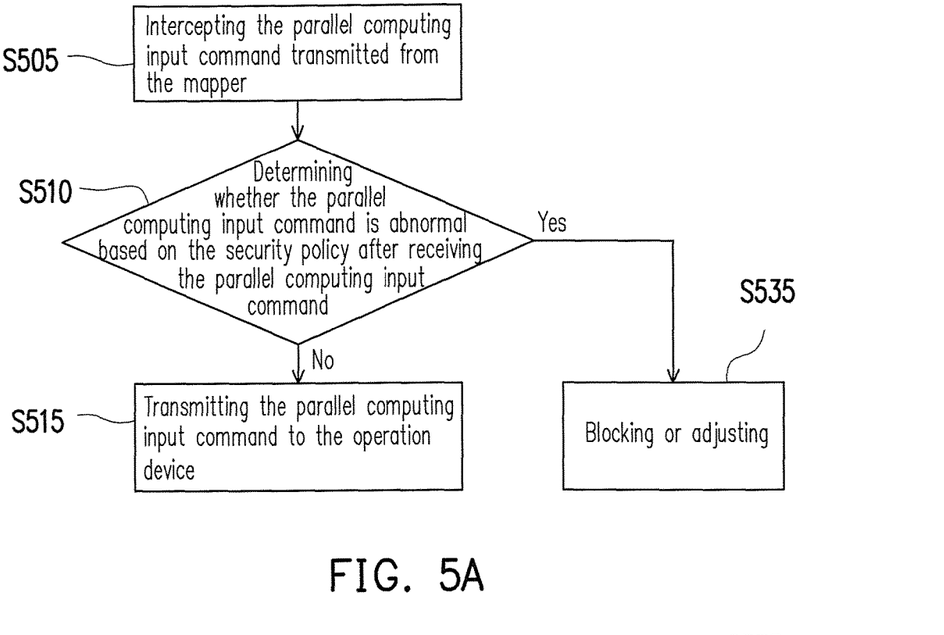
FIG. 5A and FIG. 5B are flowcharts illustrating a data processing method according to an embodiment of the disclosure.
Figure 5B:
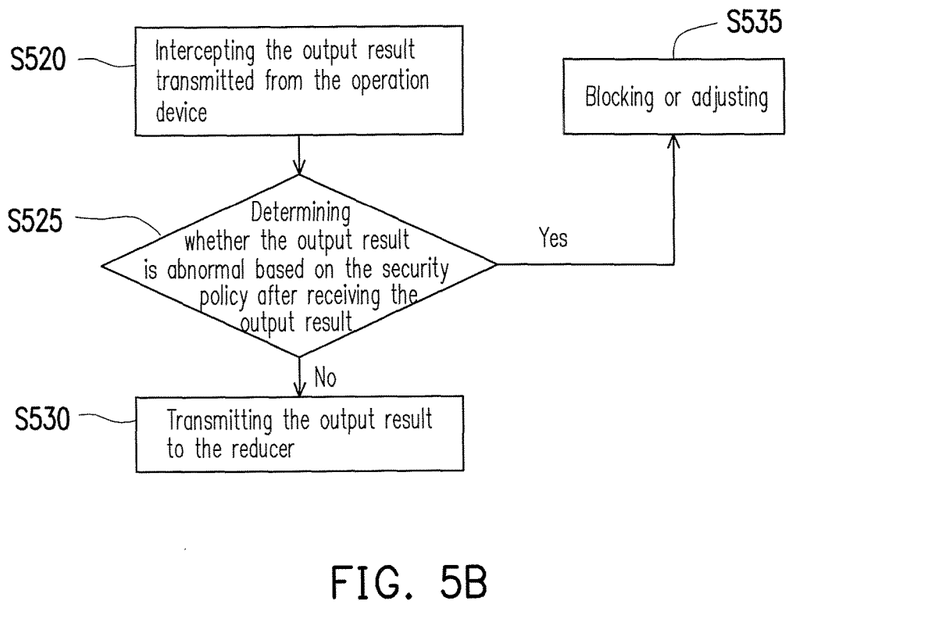

FIG. 5A and FIG. 5B are flowcharts illustrating a data processing method according to an embodiment of the disclosure. FIG. 5A shows intercepting the output of the mapper 110, FIG. 5B shows intercepting the output of the operation device 130. Here, the disclosure is not limited to the sequences in FIG. 5A and FIG. 5B. The data transmitting interface 140 can decide to execute the flow process in FIG. 5A or FIG. 5B according to the content of interception.

In step S505, the data transmitting interface 140 intercepts the parallel computing input command transmitted from the mapper 110. For example, the data transmitting interface 140 monitors all packages that are sent by the mapper 110, so as to intercept the parallel computing input command. Subsequently, in the step S510, the parallel computing input command is determined whether to be abnormal based on the security policy after the data transmitting interface 140 receives the parallel computing input command. When the parallel computing input command is determined to be not abnormal, in the step S515, the data transmitting interface 140 transmits the parallel computing input command to the operation device 130.

Considering MPI standard as an example, the data transmitting interface 140 calls a receiver function MPI_Recv and the parameters inside the receiver function MPI_Recv are determined whether to be abnormal based on the security policy after the data transmitting interface 140 receives the parallel computing input command. When the parameters inside the receiver function MPI_Recv match the security rule, the processing action corresponding to the security rule is the active action, and the parameters inside the receiver function MPI_Recv are determined to be not abnormal. Furthermore, the data transmitting interface 140 calls a transfer function MPI_S end and the parameters inside the transfer function MPI-Send are determined whether to be abnormal based on the security policy. When the parameters inside the transfer function MPI-Send match the security rule, the processing action corresponding to the security rule is the active action, and the parameters inside the transfer function MPI-Send are determined to be not abnormal. Moreover, the data transmitting interface 140 transmits the parallel computing input command to the operation device 130 directly.

The receiver function MPI_Recv and the transfer function MPI-Send as shown as following.

MPI_Send (buf, count, datatype, dest, tag, communicator, ierr).

MPI_Recv (buf, count, datatype, source, tag, comm, status).

The parameter "buf" indicates the name of the data variable which needs to be transmitted, the parameter "count" is the length of the data, the parameter "datatype" is the numeric type of the data which needs to be transmitted. The parameter "dest" is the destination in transmission (such as the rank number of the central processor, or the network address of the destination), the parameter "source" is the source (such as the number of the central processing unit, or the network address of the source), the parameter "tag" is the self-defined tag. The parameter "comm" presents the communicator. The parameter "status" presents the receiving status. The parameter "ierr" is used to examine error.

When serving as a receiver, the data transmitting interface 140 calls the receiver function MPI_Recv, so as to query the storage table 141 based on the parameter "source" and the parameter "tag" in the receiver function MPI_Recv. When serving as a transmitter, the data transmitting interface 140 calls the transfer function MPI_S end, so as to query the storage table 141 based on the parameter "dest" and the parameter "tag" in the transfer function MPI_Send.

When the parallel computing input command is determined to be not abnormal, in the step S515, the data transmitting interface 140 transmits the parallel computing input command to the operation device 130 directly. After the operation device 130 receives the parallel computing input command, the operation device 130 executes the corresponding calculation on the relevant information according to the parallel computing input command, so as to generate the calculation result (the output result).

In step S520, the data transmitting interface 140 intercepts the output result transmitted from the operation device 130. For example, the data transmitting interface 140 monitors all packages that are sent by the operation device 130, so as to intercept the output result. Subsequently, in the step S525, the output result is determined whether to be abnormal based on the security policy after the data transmitting interface 140 receives the output result. When the output result is determined to be not abnormal, in the step S530, the data transmitting interface 140 transmits the output result to the reducer 120 directly.

Considering MPI standard as an example, the data transmitting interface 140 calls the receiver function MPI_Recv and the parameters inside the receiver function are determined whether to be abnormal based on the security policy after the data transmitting interface 140 receives the output result. When the parameters inside the receiver function MPI_Recv match the security rule, and the processing action corresponding to the security rule is the active action, the parameters inside the receiver function MPI_Recv are determined to be not abnormal. Furthermore, the data transmitting interface 140 calls the transfer function MPI_Send and the parameters inside the transfer function MPI Send are determined whether to match the security rule based on the security policy. When the parameters inside the transfer function MPI_Send match the security rule, and the processing action corresponding to the security rule is the active action, the parameters inside the transfer function MPI_Send are determined to be not abnormal. Moreover, the data transmitting interface 140 transmits the output result to the reducer 120.

When the parallel computing input command is determined to be abnormal ("Yes" in Step S510), or the output result is determined to be abnormal ("Yes" in Step S525) via the data transmitting interface 140, the Step S535 is executed, and the data transmitting interface 140 blocks or adjusts the parallel computing input command or the output result.

In the Step S535, the data transmitting interface 140 decides whether to block or to adjust the parallel computing input command or the output result according to the action field F2 in the storage table 141. In terms of the parallel computing input command being abnormal, under the condition that the processing action is the filter action, the data transmitting interface 140 adjusts the content of the parallel computing input command to meet the security rule, and transmits the adjusted parallel computing input command to the operation device 130; On the other hand, under the condition that the processing action is the block action, the data transmitting interface 140 isolates the parallel computing input command, so as to block and not transmit the parallel computing input command to the operation device 130.

In terms of the output result being abnormal, under the condition that the processing action is the filter action, the data transmitting interface 140 adjusts the content of the output result to meet the security rule, and transmits the adjusted output result to the reducer 120; On the other hand, under the condition that the processing action is the block action, the data transmitting interface 140 isolates the output result, so as to block and not transmit the output result to the operation device 120.

In addition, under the condition that the processing action is the block action, the data transmitting interface 140 may further forward the parallel computing input command to the controller 310 or another data transmitting interface.

In addition, after the data transmitting interface 140 blocks the parallel computing input command or the output result, the data transmitting interface 140 can further transmit an abnormality notification to the mapper 110 so that the mapper 110 adjusts the parallel computing input command and retransmits the parallel computing input command. For example, the abnormality notification "MPI_ERR_TAG_PERM" represents that the permission of the tag is rejected, the abnormality notification "MPI_ERR_RANK_PERM" represents that the permission of the source or the destination is rejected.

Accordingly, under the condition that the transmitter which gives the command through the mapper 110 is illegal, the parallel computing input command corresponding to the command is blocked and the parallel computing input command corresponding to the command is not transmitted to the interior. Otherwise, even if the transmitter is lawful, when the command given by the transmitter exceeds the allowable authority, the parallel computing input command corresponding to the command is further filtered out.

In addition, under the condition that the receiver which receives the output result through the reducer 120 is illegal, the output result is blocked and the output result is not transmitted to the exterior. Otherwise, even if the receiver is lawful, when the executing action in the parallel computing input command exceeds the allowable authority, the output result can also be further filtered out.

In summary, the disclosure provides the data transmitting interface for monitoring the parallel computing input command and the output result inside the parallel computing system without being noticed by the mapper and the reducer, so that the data transmitting interface is used to achieve the concept of two-way firewall (from the mapper to the data transmitting interface, and from the operation device to the data transmitting interface), the attacks of the illegal user and the lawful user are simultaneously handled to avoid troubles for the company itself or other companies.

It will be apparent to those skilled in the art that various modifications and variations can be made to the structure of the disclosure without detaching from the scope or spirit of the disclosure.

What is claimed is:

1. A data processing method, comprising:
providing a parallel computing system, wherein the parallel computing system comprises a mapper, a reducer, and at least an operation device, wherein the mapper receives a command and transmits a parallel computing input command corresponding to the command to the operation device, the operation device executes a calculation based on the parallel computing input command to generate an output result and transmits the output result to the reducer;
providing a data transmitting interface, wherein the data transmitting interface is located between the mapper and the operation device, and the data transmitting interface is located between the operation device and the reducer, wherein following steps are executed via the data transmitting interface, comprising:
intercepting the parallel computing input command transmitted from the mapper;
determining whether the parallel computing input command is abnormal based on at least a security policy after receiving the parallel computing input command;
transmitting the parallel computing input command to the operation device when the parallel computing input command is determined to be not abnormal;
intercepting the output result transmitted from the operation device;
determining whether the output result is abnormal based on the at least a security policy after receiving the output result; and
transmitting the output result to the reducer when the output result is determined to be not abnormal.

2. The data processing method as recited in claim 1, wherein after receiving the parallel computing input command via the data transmitting interface further comprise:
calling a receiver function;
determining whether one or more parameters inside the receiver function are abnormal based on the at least a security policy;
calling a transfer function when the one or more parameters inside the receiver function are determined to be not abnormal;
determining whether one or more parameters inside the transfer function are abnormal based on the at least a security policy; and
transmitting the parallel computing input command to the operation device when the one or more parameters inside the transfer function are determined to be not abnormal.

3. The data processing method as recited in claim 1, wherein after receiving the output result via the data transmitting interface further comprise:
   calling a receiver function;
   determining whether one or more parameters inside the receiver function are abnormal based on the at least a security policy;
   calling a transfer function when the one or more parameters inside the receiver function are determined to be not abnormal;
   determining whether one or more parameters inside the transfer function are abnormal based on the at least a security policy; and
   transmitting the output result to the reducer when the one or more parameters inside the transfer function are determined to be not abnormal.

4. The data processing method as recited in claim 1, wherein the at least a security policy records a security rule and a corresponding processing action, the data processing method further comprises:
   if the received parallel computing input command or the received output result matches the security rule, obtaining the processing action corresponding to the matched security rule via the data transmitting interface.

5. The data processing method as recited in claim 4, wherein if the received parallel computing input command or the received output result matches the security rule, after obtaining the processing action corresponding to the matched security rule via the data transmitting interface, further comprises:
   transmitting the parallel computing input command to the operation device via the data transmitting interface, or transmitting the output result to the reducer via the data transmitting interface if the processing action is an active action;
   transmitting the parallel computing input command to the operation device, or transmitting the output result to the reducer after a content of the parallel computing input command or a content of the output result is adjusted via the data transmitting interface if the processing action is a filter action;
   isolating the parallel computing input command or the output result via the data transmitting interface so that the data transmitting interface blocks the parallel computing input command or the output result if the processing action is a block action.

6. The data processing method as recited in claim 5, wherein if the processing action is the block action, further comprising:
   forwarding the parallel computing input command to a controller or another data transmitting interface via the data transmitting interface.

7. The data processing method as recited in claim 5, further comprising:
   transmitting an abnormality notification to the mapper via the data transmitting interface so that the mapper adjusts the parallel computing input command and retransmits the parallel computing input command after the data transmitting interface blocks the parallel computing input command or the output result.

8. The data processing method as recited in claim 1, wherein the at least a security policy records a security rule and a corresponding processing action, the data processing method further comprises:
   if the received parallel computing input command or the received output result matches the security rule so as to be determined as normal, transmitting the parallel computing input command to the operation device or transmitting the output result to the reducer via the data transmitting interface; and
   if the received parallel computing input command or the received output result does not match the security rule so as to be determined as abnormal, obtaining the processing action corresponding to the security rule via the data transmitting interface, and adjusting the parallel computing input command or the output result if the processing action is a filter action, blocking the parallel computing input command or the output result if the processing action is a block action.

9. The data processing method as recited in claim 1, further comprising:
   generating the at least a security policy via a controller, comprising:
   analyzing a plurality of command logs, so as to obtain at least a predictive rule used for the operation device;
   executing an anomaly detection for the command logs via the controller based on the at least a predictive rule, so as to obtain at least a command cluster; and
   establishing the at least a security policy corresponding to the at least a predictive rule via the controller based on one or more command logs in each of the command clusters; and
   transmitting the at least a security policy to the data transmitting interface via the controller.

10. The data processing method as recited in claim 9, wherein steps of analyzing the command logs via the controller, so as to obtain the at least a predictive rule used for the operation device comprise:
    executing the anomaly detection to the command logs, so as to obtain a plurality of similar clusters;
    obtaining a predictive threshold range from each of the similar clusters; and
    comparing the predictive threshold ranges to obtain the at least a predictive rule.

11. The data processing method as recited in claim 9, further comprising:
    accumulating a number of receiving times into a corresponding receiving record via the data transmitting interface, and transmitting the receiving record to the controller, so that the controller updates the at least a security policy.

12. A data processing system, comprising:
    a parallel computing system, wherein the parallel computing system comprises a mapper, a reducer, and at least an operation device, and the mapper receives a command and transmits a parallel computing input command corresponding to the command to the operation device, the operation device executes a calculation based on the parallel computing input command to generate an output result and transmits the output result to the reducer;
    a data transmitting interface, located between the mapper and the operation device, and located between the operation device and the reducer, wherein the data transmitting interface intercepts the parallel computing input command transmitted from the mapper and intercepts the output result transmitted from the operation device;
    wherein the data transmitting interface determines whether the parallel computing input command is abnormal based on at least a security policy after receiving the parallel computing input command, and when the parallel computing input command is determined to be not abnormal, the data transmitting interface transmits the parallel computing input command to the operation device;

the data transmitting interface determines whether the output result is abnormal based on the at least a security policy after receiving the output result, and when the output result is determined to be not abnormal, the data transmitting interface transmits the output result to the reducer.

13. The data processing system as recited in claim 12, further comprising:

an abnormality predicting device, coupled to the data transmitting interface, the abnormality predicting device comprises:

a storage unit, comprising a plurality of modules and a database, wherein the database stores a plurality of command logs; and a controller, coupled to the database and executing the modules to implement an abnormality predicting method;

wherein the modules comprise:

a behavior predicting module, analyzing a plurality of command logs so as to obtain at least a predictive rule used for the operation device;

a policy generating module, executing an anomaly detection to the command logs based on the at least a predictive rule so as to obtain at least a command cluster, and establishing the at least a security policy corresponding to the at least a predictive rule based on one or more command logs in each of the command clusters; and a transmission module, transmitting the at least a security policy to the data transmitting interface.

14. The data processing system as recited in claim 13, wherein the behavior predicting module executes the anomaly detection to the command logs to obtain a plurality of similar clusters, obtains a predictive threshold range from each of the similar clusters, and compares the predictive threshold ranges to obtain the at least a predictive rule.

15. The data processing system as recited in claim 12, wherein the data transmitting interface calls a receiver function after receiving the parallel computing input command, and determines whether one or more parameters inside the receiver function are abnormal based on the at least a security policy;

the data transmitting interface calls a transfer function when the one or more parameters inside the receiver function are determined to be not abnormal, and determines whether one or more parameters inside the transfer function are abnormal based on the at least a security policy, and transmits the parallel computing input command to the operation device when the one or more parameters inside the transfer function are determined to be not abnormal.

16. The data processing system as recited in claim 12, wherein the data transmitting interface calls a receiver function after receiving the output result, and determines whether one or more parameters inside the receiver function are abnormal based on the at least a security policy;

the data transmitting interface calls a transfer function when the one or more parameters inside the receiver function are determined to be not abnormal, and determines whether one or more parameters inside the transfer function are abnormal based on the at least a security policy, and transmits the output result to the reducer when the one or more parameters inside the transfer function are determined to be not abnormal.

17. The data processing system as recited in claim 12, wherein the at least a security policy records a security rule and a corresponding processing action, the data transmitting interface determines whether the received parallel computing input command or the received output result matches the security rule; if the received parallel computing input command or the received output result matches the security rule, the data transmitting interface obtains the processing action corresponding to the matched security rule.

18. The data processing system as recited in claim 17, wherein the data transmitting interface transmits the parallel computing input command to the operation device, or transmits the output result to the reducer if the processing action is an active action, the data transmitting interface transmits the parallel computing input command to the operation device, or transmits the output result to the reducer after a content of the parallel computing input command or a content of the output result is adjusted if the processing action is a filter action; and the data transmitting interface isolates the parallel computing input command or the output result so that the data transmitting interface blocks the parallel computing input command or the output result if the processing action is a block action.

19. The data processing system as recited in claim 18, wherein the data transmitting interface transmits an abnormality notification to the mapper so that the mapper adjusts the parallel computing input command and retransmits the parallel computing input command after the data transmitting interface blocks the parallel computing input command or the output result.

20. The data processing system as recited in claim 12, wherein the at least a security policy records a security rule and a corresponding processing action, if the received parallel computing input command or the received output result matches the security rule, the data transmitting interface determines that the parallel computing input command or the output result is not abnormal, and transmits the parallel computing input command to the operation device or transmits the output result to the reducer; and if the received parallel computing input command or the received output result does not match the security rule, the data transmitting interface determines that the parallel computing input command or the output result is abnormal and obtains the processing action corresponding to the security rule, the data transmitting interface adjusts the parallel computing input command or the output result if the processing action is a filter action, the data transmitting interface blocks the parallel computing input command or the output result if the processing action is a block action.

* * * * *